July 20, 1971 TATSURO KANOKOGI 3,594,154
IRON MAKING PROCESS AND ITS ARRANGEMENT THEREOF
Filed May 14, 1968 2 Sheets-Sheet 1

INVENTOR.
TATSURO KANOKOGI
BY
ATTORNEY

United States Patent Office 3,594,154
Patented July 20, 1971

3,594,154
IRON MAKING PROCESS AND ITS
ARRANGEMENT THEREOF
Tatsuro Kanokogi, Kyoto-shi, Japan, assignor to Sumitomo Metal Industries Ltd., Higashi-ku, Osaka-shi, Japan
Filed May 14, 1968, Ser. No. 729,048
Claims priority, application Japan, May 20, 1967, 42/32,215; Dec. 20, 1967, 42/82,135
Int. Cl. C21b 5/06
U.S. Cl. 75—41                             6 Claims

ABSTRACT OF THE DISCLOSURE

An improved process for iron making and arrangements thereof characterized in that fuel and ore burden are charged into a smelting shaft furnace so as to form three separate vertical zones of central columnar fuel zone, an intermediate annular ore material zone and an annular fuel zone along the inner wall surface of the furnace, a part of extracted furnace gases is thermally heated, reformed and recycled together with oxygen and fuel through tuyeres into the furnace. Pig iron is produced at a high rate, with low consumption of fuel and the operation is smooth.

---

Figure 1:
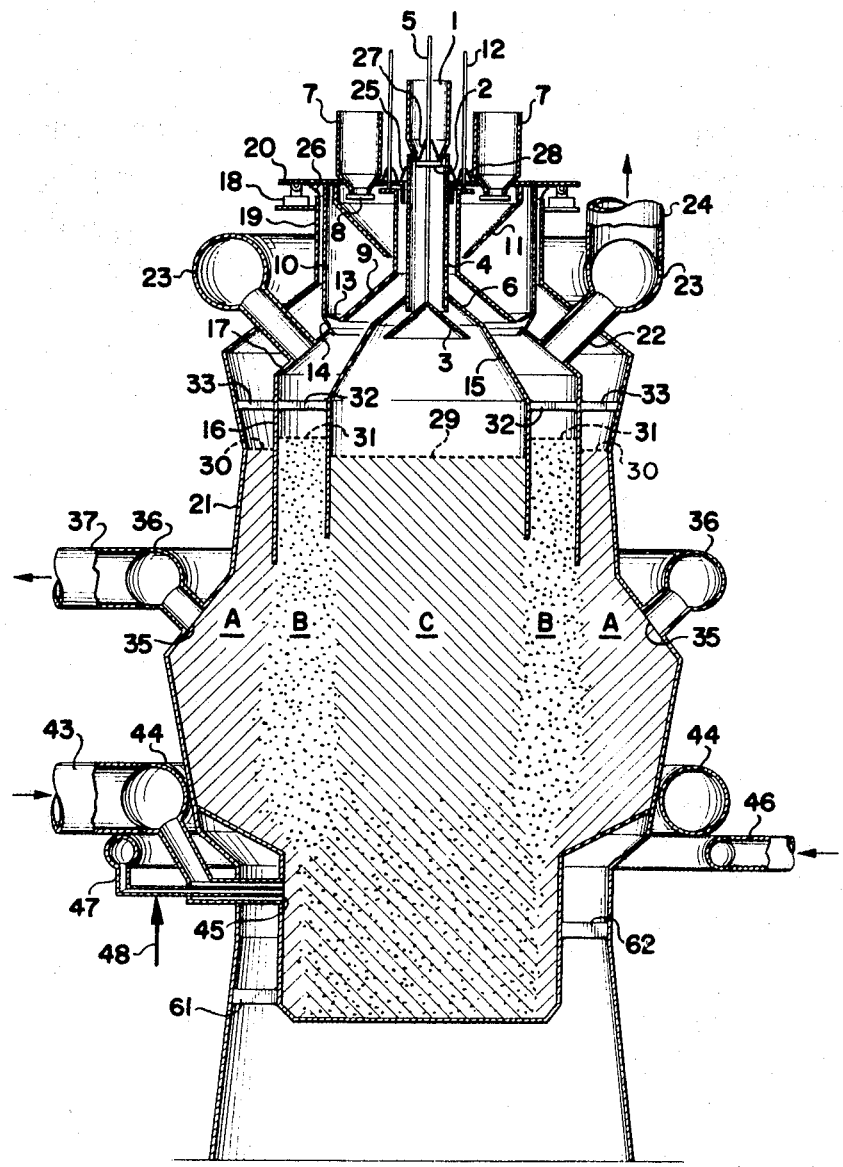

This invention relates to an improvement of iron making process.

Conventional blast furnaces for iron making are operated in such way that ore burden and cokes as fuel are charged alternately in layers into the furnace and a hot blast is supplied through tuyeres in order to produce high temperature reducing gas in the furnace.

In order to effectively utilize the hot reducing furnace gases generated in the furnace, it is essential to effect sufficient heat exchange between the burdens and the gases, and effectively reduce the ore burdens. For this reason, there has been a tendency in recent years to use larger and larger furnaces.

In the meantime, various technological improvements have hitherto been made to increase the productivity of blast furnace $$\frac{\text{Daily output of pig iron}}{\text{inner volume of blast furnace in cu. m.}}$$

including, for example, sizing and foretreatments of ore burdens, use of good-quality coke, high-pressure operation, increase of blast temperature, control of water vapor in hot blast, oxygen enrichment in hot blast, and blowing-in of oil or gas fuels into the furnace. As a result, very favorable operation results as shown in Table 1 are typical at present.

TABLE 1

Amount of blast (per ton of pig iron)—1250 Nm.$^3$
Blast temperature—1100° C.
Water content of blast (g./Nm.$^3$ blast)—25
Coke amount (per ton of pig iron, ash content 10%)—460 kg.
Heavy oil amount (per ton of pig iron)—50 kg.
Amount of furnace gases (per ton of pig iron)—1814 Nm.$^3$
Furnace top temperature (° C.)—215
Furnace gas components:
    CO—23.0%
    $CO_2$—19.3%
    $H_2$—3.0%
    $N_2$—54.3%
Calorific value of furnace gases—790 Kcal./Nm.$^3$
Productivity of blast furnace (daily output of pig iron/in. v. of furnace)—2.0 t./m.$^3$ However, a careful study of the results of conventional blast furnace operations indicate a number of difficulties or problems yet to be solved, for example (1) large amount of top gas containing unused reducing gas ($H_2$+CO) which cannot be utilized completely, (2) large furnace gas volume necessary per ton of pig iron produced, (3) heat consumption required for the decomposition of water and heavy oil in the neighborhood of the tuyere portion inside the furnace, (4) heat losses due to water cooling of the furnace body and tuyeres, and (5) endothermic reaction as solution loss or direct reduction of ore in the high-temperature region of the furnace.

The present invention is directed to eliminate the foregoing difficulties in blast furnace operation. Unlike the conventional blast furnace process in which ore and coke are charged into the furnace from the top thereof in alternate horizontal layers, the process according to the present invention is characterized in that it is practised in the following manner. Fuel and ore burden are separately and vertically charged into a smelting shaft furnace in such way that a central columnar fuel zone is formed in the center of the furnace and an annular surrounding fuel zone is formed along the surrounding wall of the furnace, thus defining an annular ore material zone between the central columnar fuel zone and the annular surrounding wall fuel zone. Thus the furnace gases generated at the tuyere level in the furnace are led through the columnar central fuel zone and then through the annular ore material zone where reduction of the ore burdens from the interior to the outside of ore zone occurs. A part of said gases is passed through the annular fuel zone extracted out of the furnace, and then dust removed, pressurized, heated, reformed, and recycled to the furnace through the tuyere together with oxygen and fuel. On the other hand, the rest of the gases are allowed to rise through the annular ore zone, where heating and reducing the ore burden occur and finally they pass out from the furnace top.

As stated above, the overall amount of the reducing furnace gases comprises the recycled reducing gas which has been heated and reformed in the gas heater-reformer outside of the furnace and reintroduced into the furnace through the tuyere, the reducing gas generated by the combustion of fuels with the oxygen blown in from the tuyere, and a minimum of direct reduction gas produced within the furnace.

To control the overall amount of reducing furnace gases, the reducing gas volume may be controlled by the amount of gas extraction for recycling by the addition of furnace top gas, and by the addition of the hydrocarbonic fuel to the gas heater-reformer for the gas being recycled. When the sensible heat of reducing furnace gases is found insufficient, the amount of oxygen to be supplied through the tuyere may be increased. In order to reduce the operation cost, however, it is possible to blow air into the annular ore material zone thereby burning part of the furnace gases to give sensible heat to the ore material.

The present invention is further characterized by the use of the furnace gases from the furnace top, after dedusting, dehydration and pressurization, as the heat source for the heating and reforming of the recycled reducing gas.

As will be understood from the foregoing, the reduction of ore burdens according to the process of our invention is accomplished for the most part by indirect reduction with reducing furnace gas, the endothermic reaction by direct reduction or solution loss reaction is negligible, not only the temperature of reducing gases at any point of the smelting furnace can be kept higher than that of the ore burdens, but also it can be expected that the FeO content of slag can be decreased, desulfurization improved, and rapid heat exchange be carried out between the ore burdens the reducing furnace gases. Also, it can be expected that by utilizing the solution loss of extracted gas at the annular fuel zone along the surrounding furnace wall, the temperature of the withdrawn gas can be decreased and, at the same time, the heat loss from the furnace body also be decreased. It may be expected that cooling of the furnace body can be minimized. Moreover, according to the present invention, furnace gases are comprised almost solely of reducing gases, and the amount of said reducing gases required for unit output of pig iron is less than those in ordinary blast furnaces containing large amount of $N_2$ gas. The gas amounts are further decreased by the extraction of furnace gases, the area through which the gases pass is several times greater than that of a conventional blast furnace, and the flow rate is low. With all these ideal factors combined, the productivity of the iron smelting shaft furnace according to the present invention attains a productivity several times greater than that of an ordinary blast furnace.

The furnace arrangement and operating conditions for iron making according to the present invention are more particularly illustrated in referring drawings.

Figure 2:
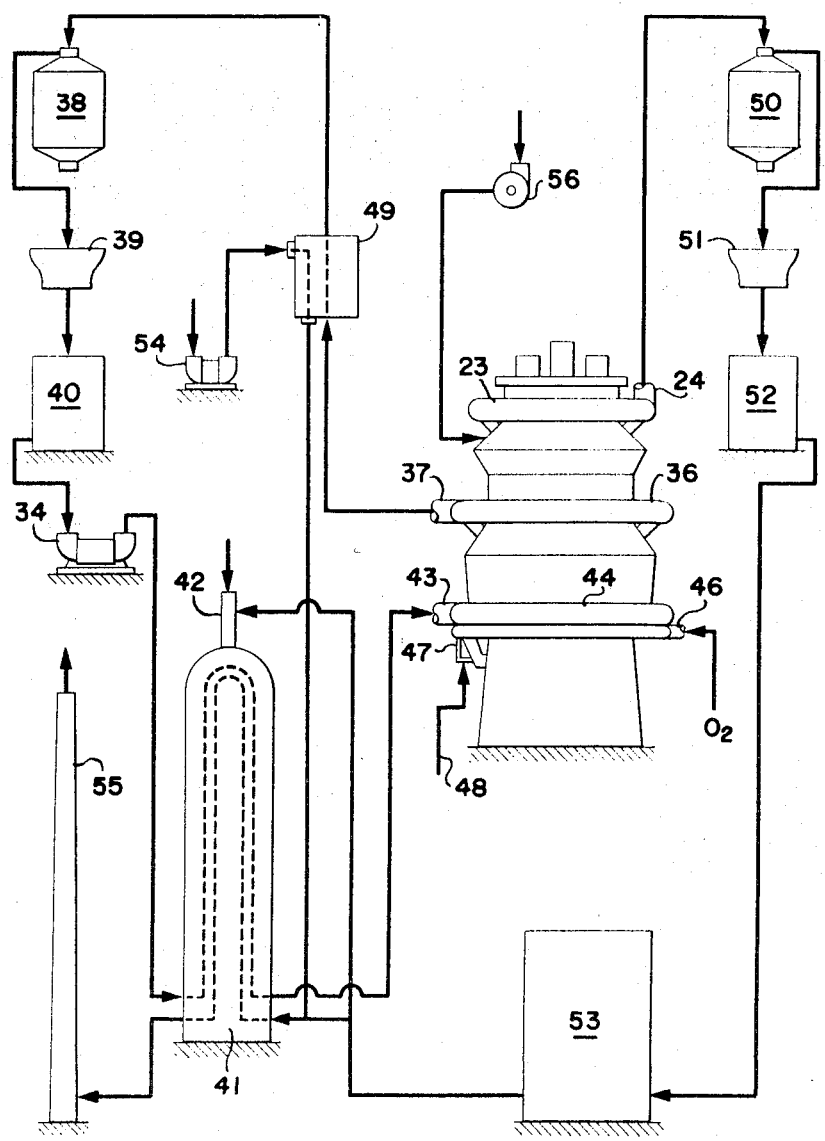

FIG. 1 is a diagrammatic view of a smelting shaft furnace according to the present invention; and FIG. 2 is a diagram of the whole system of the present invention.

Referring specifically to FIG. 1, fuel such as coke or coal are carried up to above the top of the furnace by fuel conveying means (not shown) such as skip or belt-conveyor, and placed in a fuel hopper 1 for feeding the fuel to the furnace core. As a valve 2 at the bottom of the hopper 1 is opened, the fuel is dropped and stored in a fuel bell hopper 4 provided beneath the hopper 1. Next, the valve 2 is closed, and a small bell 3 is descended with a bell rod 5 by means (not shown) for opening and closing the small bell. This in turn opens a seal 6 positioned between the small bell 3 and bell hopper 4, permitting the fuel to be charged into the furnace up to the height of stock line 29 inside an inner, annular partition wall 15, thereby forming a vertical, columnar fuel zone C. Then, the small bell 3 is raised with the bell rod 5 by means for opening and closing the same. The seal 6 for the bell hopper 4 is closed again. By repeating the above procedures, the central columnar fuel zone can be continuously formed in the center of the furnace up to the height of the stock line.

In the meantime, the cokes for the annular fuel zone along the inner wall of the furnace and the iron ores, fluxes and other materials for annular ore burden zone are carried up to the top of the furnace by any conventional suitable means (not shown) such as skip or belt conveyors, and are supplied individually into the hopper 7 which are arranged equidistantly from the center of the furnace. As valves 8 for the hoppers 7 are opened, the ores and fuel drop down along a chute 11 into a vessel defined by the large bell hopper 10 and large bell 9 below the hoppers 7, and are stored therein. Then, the valves 8 for hoppers 7 are closed.

The annular fuel zone of coke along the inner wall surface of the furnace is formed in the following way. First, the coke is passed from the hoppers 7 through valves 8, chute 11 and is stored in the vessel defined by the large bell hopper 10 and large bell 9. Next, lifting means 18 for the large bell hopper 10 secured to the furnace top 19 are operated to lift the hopper 10 by way of a support 20. Thus, seals 13 which are provided betwen the large bell 9 and large bell hopper 10 and the seals 14 are opened. Seals 14 are provided between the large bell hopper 10 and the top lid 17 of outer annular partition wall 16. The latter extends downwardly from the top of the furnace to some meters underneath the stock line 31. As a consequence, the cokes slide down along the upper faces of the large bell 9 and top lid 17, and are charged into the furnace up to the level of the stock line 30 between the furnace wall 21 and outer annular partition wall 16, thus forming an annular fuel zone A along the inner wall surface of the furnace.

Ore burdens are charged in the manner similar to the introduction of coke as above described. At first, the ore materials are collected in the space defined between the large bell hopper 10 and large bell 9. Then, by lifting and lowering means (not shown) for the large bell 9, the bell is lowered with the large bell rod 12. This results in opening of the seal 13 between the large bell 9 and large bell hopper 10, and charging of the ore burdens into the furnace in an annular form up to the level of stock line 31 between the inner and outer annular partition walls 15, 16, thereby constituting an annular ore material zone B.

Repeating the above procedures permits continuous formation of the annular fuel zone along the inner furnace wall A and the annular ore zone B up to the predetermined stock lines.

In FIG. 1, furnace top gases which ascend through the annular ore zone leave the furnace through flues 22, 23 and 24. Also, seals 25, 26, 27 and 28 are provided to prevent leaks of top gases through gaps between the furnace top and large bell hopper and between the furnace top and bell rod.

The hopper 1 for receiving the fuel and the hoppers 7 for receiving ore materials and fuel may be of bell type instead of the valve type. In order to ensure uniform charging of the fuel and ore burden into the furnace, it is possible to use a greater number of hoppers 7 for receiving the fuel and ore materials or a greater number of valves for the hoppers or it is possible to provide means for adjusting the chute angle or the relative positions of the chute and bell.

It is further possible to modify the sealing method, the relative position and mechanism of the large bell 9, large bell hopper 10 for the ore burden and fuel, and the top lid 17 for the outer annular partition wall and large bell hopper 10 so as to prevent mingling of fuel and ore materials. In this manner, the uniformity of charge is improved.

The means for lifting or opening and closing the small bell 3, the large bell 9 and the large bell hopper 10 may be of mechanical, hydraulic or other suitable type of known construction and mechanism. To maintain the concentric relationship among the furnace wall and inner and outer annular partition walls, any supporting means 32, 33 of heat-resisting steel or refractory materials may be positioned between them. These supporting means may be water- or air-cooled for extended service life.

According to the present invention, if a part or the entire amount of the coke in the central fuel zone is replaced by coal, means for burning out the tarry by-product must be mounted on the furnace top so that any obstacles by tar in the recycle gas system and top gas systems are prevented.

The charge ratio of the fuel and ore burden in the practice of the present invention may be kept substantially constant by suitable design of the cross sectional areas of (A), (B) and (C) zones at the respective stock lines. In actual operation, the ratio may be varied over a substantial range, for example, by raising or lowering the stock lines, suppying fuel oil to the tuyeres, and by controlling the amounts of oxygen blown through the tuyere as well as the amount of reducing gas to be recycled.

According to the present invention, when each of the ore burdens, fuel and other necessary supplies charged into the smelting shaft furnace as described above fall through the furnace with their respective speeds, they are heated or reduced by the furnace gases. Upon reaching the high temperature region in the smelting furnace, the ore burdens are melted and separated into molten iron and slag, and are collected at the bottom of the furnace. The molten iron and slag are taken out, respectively, through a pig iron outlet 61 and slag outlet 62 as in the conventional shaft furnace.

Now the operation of the whole system of the smelting shaft furnace in accordance with the present invention will be described specifically with reference to FIG. 2.

In the figure, a part of the furnace gases are extracted by a compressor 34 as gas to be recycled. The gases pass through extracting opening 35 provided around the periphery of the furnace body, annular extraction pipe 36, extraction main 37, heat exchanger 49, and into a dust collector 38 where dust is partially removed. From there, gases pass through a venturi scrubber 39 for cooling, dehydration and further dust removal. Then, by an electric dust collector 40, the gases are substantially completely cleaned. They are then compressed by the compressor 34 to a predetermined pressure, and forced into a gas heater-reformer 41, where they are heated to a temperature of 1000° to 1500° C. At the same time, hydrocarbon fuels 42 are added into the gas heater-reformer 41. Thus, gaseous $CO_2$ and $H_2O$ contained in the reextracted gas are converted into CO and $H_2$, and the necessary amount of high-temperature, recycling reducing gases are produced. The produced gases are blown into the furnace through tuyeres provided at the bottom of the smelting furnace via a recycling gas main 43 and annular pipe 44. On the other hand, oxygen supplied from an oxygen generator (not shown) passes through an oxygen line 46 and blow pipe 47 into the furnace together with the gases being recycled through the tuyeres. Oxygen reacts with the coke in the furnace and the additional oil or gas fuel from 48 to produce the reducing furnace gases of desired high temperature and amount.

Throughout FIGS. 1 and 2, the remaining part of the furnace gases is utilized for heating and reduction of the ore burdens as the gases pass through the annular ore zone which is defined between the inner and outer annular partition walls 15, 16, and as they are discharged through the flues 22, 23 and 24 arranged on the conical lid 17 on the extension of the outer annular partition wall 16. Since the furnace top gases thus exhausted still retain a fairly high degree of calorific power, said gases pass through a dust collector 50, venturi scrubber 51 and electric dust collector 52 for dust removal and cooling. Then they are stored in a tank 53 and subsequently used for the heating of the recycled gas heater-reformer 41. If the furnace top gas alone cannot provide the heat sufficient for heating and reforming of the recycling gas heater-reformer 41, the deficiency may be made up with other fuel 42.

Air for use for heating of the gas heater-reformer 41 is supplied by a blower 54 and it may be preheated by the heat exchanger 49 for the extracted recycling gases from the furnace, so as to improve the thermal efficiency of the whole process. A stack 55 is provided for the exhaust gas of the heater-reformer 41. A blower 56 is used for burning a part of the furnace gases when the sensible heat of the furnace gases in the annular ore zone appears to be insufficient and for the conversion of the tar to reducing gases. The results of operation with an experimental plant which embodied the present invention are given in Table 2.

TABLE 2

Amount of gases being recycled blown in (per ton of pig iron)—ab. 1100 $Nm.^3$
Temperature of gases being recycled blown in—1300° C.
Amount of gases extracted (per ton of pig iron, after washing)—801 $Nm.^3$
Compositions of extracted gases (after washing):

$CO_2$—12.6%
CO—70.5%
$H_2$—14.8%
$N_2$—1.3%

Temperature of extracted gases (at exit)—695° C.
Amount of coke used (per ton of pig iron)—251 kg.
Amount of hydrocarbon fuel used (per ton of pig iron)—133.4 kg.

Amount of furnace top gases produced (per ton of pig iron, after washing)—ab. 700 $Nm.^3$
Compositions of furnace top gases (per ton of pig iron, after washing):

$CO_2$—43.1%
CO—35.0%
$H_2$—9.1%

Oxygen consumption at tuyeres (per ton of pig iron, purity 99.5%)—154 $Nm.^3$

As described above, the process of the present invention is fundamentally different from the conventional process for blast furnace operation. The invention thus provides a novel iron making processed instead of the common blast furnace process which appears now to be at the limit of developments from the standpoint of metallurgical engineering. This invention has the following advantages:

(1) The process of the invention involves practically no solution loss reactions which usually occur in conventional blast furnaces caused by passage through cokes layers of the furnace gases after reduction of the iron oxides, and therefore almost no endothermic reaction due to solution loss reactions takes place.

(2) In the process of the invention, the solution loss is induced only when the extraction gases pass through the annular coke zone along the inner wall surface of the furnace. It decreases however the temperature of the extracted gas and reduces the heat loss due to the extraction of furnace gas and simultaneously lowers the temperature of the furnace wall in contact with the extracted gas, so that the heat loss from the furnace body can be decreased. Further, the solution loss reaction improves the composition of the extracted gas and thereby saves the energy required for the heating and reforming of the recycling gases.

(3) According to the process of the present invention, the differential amounts between the furnace gases and the extracted gases pass upward through the annular ore zone to become the furnace top gas. For this reason, the resulting gas has a low CO content. Thus, the carbon deposition reaction as is observed in ordinary blast furnace is eliminated.

(4) According to the process of the present invention, the harmful components in the burdens such as Zn, Pb, Sn, K and Na do not build up within the furnace as in conventional blast furnaces but are removed off from the furnace together with the extracted gases.

(5) Since the smelting furnace operation in accordance with the present invention is conducted by blowing pure oxygen into the furnace, the resulting furnace gases comprise mostly completely reducing gases. Therefore, the amount of reducing gas within the furnace is more than twice that of an ordinary balst furnace when calculated per ton of the pig iron made. As the furnace gases are free from $N_2$, the total amount of the gases is less than that of the conventional blast furnace by about 20 percent. Moreover, the extraction of furnace gases increases the area over which the furnace gases pass through, decreasing draft resistance. These effects can combine altogether to improve the furnace productivity.

(6) According to the process of the present invention, the reducing as temperature in the furnace can be kept at a considerably higher temperature than that of ore burdens so that the heat exchange rate is high, which indicates the possibility of a high productivity of pig iron.

(7) Because the annular coke zone formed along the inner wall surface of the furnace in accordance with the present invention serves as a wall refractory, the use of furnace bricks may be practically limited to the furnace bottom and the cooling of the furnace body can be minimized.

(8) In the process of the invention, coal may be employed in lieu of coke to form the central columnar fuel zone in the furnace, in which case not only coking is carried out within the furnace but, in addition, the resulting coal gases advantageously are used for the reduction of the ore burdens.

(9) In the process of the invention, the ore materials descend while being reduced between the fuel zones, and therefore slipping, hanging and other troubles as in the ordinary blast furnaces rarely occur.

(10) According to the process of the present invention, the coke consumption is automatically governed by the operating conditions and there is no necessity for predetermination of the coke charge rate as is required in common blast furnace operation.

I claim:

1. An iron making process which comprises charging fuel and ore burden into a smelting shaft furnace in such manner that a central columnar fuel zone, an annular ore zone, and an annular fuel zone along the inner wall surface of the furnace are formed from the center of the furnace outwardly and concentrically, extracting a portion of furnace gases through the annular fuel zone formed along the inner furnace wall, removing dust from said portion, dehydrating said portion, pressurizing said portion, adding carbonaceous fuel to said pressurized portion and heating said pressurized portion and carbonaceous fuel to reform the reducing gases, and blowing said reducing gases together with oxygen into the furnace through tuyeres, passing the rest of furnace gases through the annular ore zone thereby heating and reducing the ore burden and finally discharging said rest of the gases from the furnace top as top gases.

2. A process as defined in claim 1 wherein a part of the furnace top gases discharged from the furnace top is also recycled to said furnace through said tuyeres.

3. A process as defined in claim 1 wherein the fuel constituting the central columnar fuel zone is coke or coal.

4. A process as defined in claim 1, comprising blowing a hydrocarbon fuel through the tuyeres into the furnace together with the recycled reducing gas and oxygen.

5. A process as defined in claim 1 comprising feeding oxidizing gas to the annular ore zone and promoting the heating of the ore burdens by burning of a part of the furnace gases in said annular ore zone.

6. A process as defined in claim 1, comprising subjecting the furnace top gas discharged from the upper portion of the annular ore zone to dust removal, dehydration, and pressurization and reusing said pressured top gas as a heat source for the heating and reforming of the recycled reducing gas.

References Cited

UNITED STATES PATENTS

| | | | |
|---|---|---|---|
| 284,384 | 9/1883 | Colliau | 266—27X |
| 455,458 | 7/1891 | Eames | 75—41 |
| 783,044 | 2/1905 | Johnson | 75—41 |
| 2,208,245 | 7/1940 | Boynton | 75—41 |
| 2,790,711 | 4/1957 | Sellers et al. | 75—41 |
| 2,814,478 | 11/1957 | Van Loon | 266—27 |
| 3,458,307 | 7/1969 | Marshall et al. | 75—42 |

HENRY W. TARRING II, Primary Examiner

U.S. Cl. X.R.

266—27